United States Patent
Dean, Jr. et al.

(10) Patent No.: US 7,355,318 B2
(45) Date of Patent: Apr. 8, 2008

(54) MICROMACHINED DEVICE UTILIZING ELECTROSTATIC COMB DRIVES TO FILTER MECHANICAL VIBRATIONS

(75) Inventors: Robert Neal Dean, Jr., Auburn, AL (US); George Timothy Flowers, Ecelctic, AL (US)

(73) Assignee: Auburn University, Auburn, AL (US)

( * ) Notice: Subject to any disclaimer, the term of this patent is extended or adjusted under 35 U.S.C. 154(b) by 101 days.

(21) Appl. No.: 11/149,922

(22) Filed: Jun. 10, 2005

(65) Prior Publication Data

US 2005/0274186 A1 Dec. 15, 2005

Related U.S. Application Data

(60) Provisional application No. 60/579,115, filed on Jun. 12, 2004, provisional application No. 60/579,116, filed on Jun. 12, 2004.

(51) Int. Cl.
*H02N 1/00* (2006.01)
(52) U.S. Cl. ..................... 310/309; 73/514.18
(58) Field of Classification Search ............. 73/514.18, 73/514.32; 310/309
See application file for complete search history.

(56) References Cited

U.S. PATENT DOCUMENTS

| | | | | |
|---|---|---|---|---|
| 5,618,989 A | * | 4/1997 | Marek | ..................... 73/514.32 |
| 5,969,848 A | * | 10/1999 | Lee et al. | ..................... 359/298 |
| 6,536,280 B1 | * | 3/2003 | Carley | ..................... 73/504.02 |
| 6,838,738 B1 | * | 1/2005 | Costello et al. | ............. 257/414 |
| 6,964,195 B2 | * | 11/2005 | Hobbs et al. | ............. 73/504.14 |
| 2002/0005976 A1 | * | 1/2002 | Behin et al. | ................. 359/254 |

* cited by examiner

*Primary Examiner*—John E. Chapman
(74) *Attorney, Agent, or Firm*—Andrus, Sceales, Starke & Sawall, LLP

(57) ABSTRACT

A micromachined device for filtering mechanical vibrations caused by an external disturbance is disclosed. The device can include a first electrostatic vertical comb drive assembly having a first array of stationary elements and a second array of movable elements correspondingly interspersed with the first array. The device can also include a plurality of springs, each springs coupled between a support frame and a proof mass. The first drive assembly can be configured for motion in the z-direction. The device can include a sensor for sensing a position of the proof mass relative to the support frame by measuring displacement between each of the stationary and movable elements. The device can further include a second electrostatic vertical comb drive assembly. The device can have multiple electrostatic comb drive assemblies. An optional feedback network signal processes a displacement measurement to control one of the drive assemblies.

32 Claims, 3 Drawing Sheets

MICROMACHINED DEVICE UTILIZING ELECTROSTATIC COMB DRIVES TO FILTER MECHANICAL VIBRATIONS

CROSS REFERENCE TO RELATED APPLICATIONS

The present application is based on and claims priority under 35 U.S.C. §119(e) of the now abandoned U.S. Provisional Patent Application, Ser. No. 60/579,115, filed Jun. 12, 2004, and entitled "MULTI-AXIS ELECTROSTATICALLY TUNED MICROFABRICATED VIBRATION FILTER." The U.S. Provisional Patent Application, Ser. No. 60/579,115 filed Jun. 12, 2004, and entitled "MULTI-AXIS ELECTROSTATICALLY TUNED MICROFABRICATED VIBRATION FILTER" is also hereby incorporated by reference. This application also claims priority under 35 U.S.C. §119(e) of the now abandoned U.S. Provisional Patent Application, Ser. No. 60/579,116, filed Jun. 12, 2004, and entitled "ELECTROSTATIC COMB DRIVE TUNED MICROFABRICATED VIBRATION FILTER." The U.S. Provisional Patent Application, Ser. No. 60/579,116 filed Jun. 12, 2004, and entitled "ELECTROSTATIC COMB DRIVE TUNED MICROFABRICATED VIBRATION FILTER" is also hereby incorporated by reference.

FIELD OF THE INVENTION

This invention relates to vibration filtering techniques for miniaturized systems. More specifically, this invention relates to micromachined devices for filtering vibrations caused by external disturbances by utilizing electrostatic vertical comb drives to measure displacement between a support frame and a proof mass, and to generate restoring forces.

BACKGROUND OF THE INVENTION

Vibration isolation techniques are used to reduce the motion transmitted from a vibratory base to a device or system. The basic components are illustrated in FIG. 1. The device, represented by the rigid mass, m, is connected to the base with a linear spring and damper pair, k and c, respectively. The governing equation for this system is:

$$m\ddot{x}+c(\dot{x}-\dot{y})+k(x-y)=0$$

or $$\ddot{x}+2\zeta\omega_n(\dot{x}-\dot{y})+\omega_n^2(x-y)=0$$

where $2\zeta\omega_n=c/m$ and $\omega_n^2=k/m$.

For practical purposes, transmissibility is defined as the ratio of the amplitude of the device motion (x) to that of the base motion (y). Assume that y(t) is sinusoidal of frequency $\omega$. Some algebraic manipulation gives:

$$TR = \left(\frac{1+(2\zeta\beta)^2}{(1-\beta^2)^2+(2\zeta\beta)^2}\right)^{1/2}$$

where $\beta=\omega/\omega_n$.

The damping ratio, $\zeta$, is equal to $0.5\, c/(mk)^{1/2}$. A plot of TR for various levels of the damping ratio, $\zeta$, is shown in FIG. 2.

A passive mechanical spring-mass-damper system with external vibrational excitation is analogous to a passive electrical network consisting of resistors, capacitors and inductors that is excited by a voltage waveform. Both systems can be utilized as second order filters with the following Laplacian characteristic equation:

$$s^2+2s\zeta\omega_n+\omega_n^2=0$$

where $\omega_n$ is the system natural frequency and $\zeta$ is the damping coefficient. Such systems can be utilized to spectrally pass, reject, or attenuate frequency components of the external forcing function's bandwidth, whether a voltage signal for an electrical filter or a vibrational waveform for a mechanical filter.

However, unlike electrical filters where the system components can be easily tunable, mechanical filter components are difficult to tune. As such, the filter characteristics ($\omega_n$ and $\zeta$) are difficult to adjust in mechanical filters (vibration filters). This is particularly complicated in micromachined or MEMS devices, which are usually fabricated in crystalline silicon, because it is difficult to obtain sufficient damping to prevent ringing. This is often accomplished by hermetically packaging the MEMS device in a fluid at a prescribed pressure, and tailoring the device design to utilize squeeze-film or sheer resistance damping. These techniques are both expensive to implement and limited in application. Without sufficient damping, mechanical devices will oscillate (ring) for an unacceptably long length of time when externally excited.

In macroscale devices, electromagnetic actuators (such as DC or AC motors) are far more efficient and practical than electrostatic actuators. However, as devices are shrunk to the micro level, electromagnetic forces shrink faster than electrostatic forces because electromagnetic forces tend to be proportional to volume while electrostatic forces tend to be proportional to area, for the same amount of applied energy. Therefore for micro (i.e. MEMS) devices, electrostatic forces tend to be stronger than electromagnetic forces. Hence, electrostatic actuators are often used in MEMS applications.

A commonly used MEMS electrostatic actuator is the comb drive actuator, which consists of two comb shaped structures aligned to interdigitate the comb teeth. One of the combs is spatially fixed, while the other one is allowed to move so that its interdigitated teeth can move into or out of the teeth of the fixed comb. When a voltage is applied across the two combs, the resulting electrostatic force is equal to:

$$F_T = \frac{n\beta h \varepsilon_r \varepsilon_o V^2}{d_O}$$

where $F_T$ is the tangential force pulling the combs together, n is the number of active teeth in the moveable comb, $\beta$ is the fringe effect correction factor, h is the overlapping height between comb teeth, $\varepsilon_r\varepsilon_o$ is the permittivity of the dielectric and $d_O$ is the fixed distance between a moveable comb tooth and a stationary comb tooth. Note that the force is proportional to the applied voltage squared, and is not proportional to the distance the movable comb has traveled.

Most comb drive actuators used to date in MEMS devices have been horizontally oriented, and usually implemented in silicon substrates. However, a vertical comb drive that moves the comb in or out of the plane of the silicon substrate in a particular MEMS micro mirror device application is known.

Tunable mechanical dynamic systems have been developed that are based around spring-mass-damper systems for a variety of applications. Typically, they consist of a mechanical system that serves some function that has at least one mechanical element that is tunable by moving a mechanical member with an actuator. Additionally, these systems employ a sensor of some kind to detect that the mechanical system needs tuning. Then a feedback mechanism is utilized to generate the actuation drive signal necessary to correct the error detected by the sensor. Often, the feedback mechanism is electronic and involves analog or digital signal processing. Examples include vibration sensing, vibration isolation, mechanically tuned electrical filters and MEMS tunable chaotic oscillators.

Some MEMS devices, such as many MEMS gyroscopic sensors, are extremely sensitive to and adversely affected by high frequency vibrations, which may be present in the environment in which the sensors are used. In order to use these kinds of devices in mechanically harsh environments, they must be protected from high frequency vibrations. This can be accomplished by fabricating a MEMS vibration filter and incorporating it into the sensor package to isolate the sensor die from high frequency vibrations. Passive MEMS vibration filters have been investigated for this purpose. Unfortunately, they lack tunability and suffer from excessive ringing due to the difficulties in obtaining sufficient mechanical damping in silicon based MEMS devices.

A MEMS spring-mass-damper mechanical system can be fabricated by micromachining silicon or some other material. A simple example of a MEMS system 10 is illustrated in FIG. 3. The system 10 consists of a frame 20, a proof mass 30 and four springs 40 that are fabricated out of the same material through MEMS fabrication processes, although they could be made from different materials. Damping (not shown) is provided through internal mechanical losses and/or external squeeze-film or sheer resistance methods. The springs 40 are designed to allow the proof mass 30 to move with respect to the frame 20 with one or more degrees of freedom, and may be of any shape. Additionally, the springs 40 are usually designed so that the proof mass 30 has much more mass than the spring structures. This structure has a second order low-pass frequency response, where the resonant frequency has been set by the proof mass and the system spring constant.

Problems with the type of system presented in FIG. 3 include the lack of a convenient way to obtain sufficient damping and the lack of tunability of the frequency response. What is needed is a micromachined device utilizing electrostatic actuators to filter vibrations caused by an external disturbance. What is also needed is a micromachined device having vertical comb drives to measure displacement between stationary and movable comb drive elements, and to generate a restoring force.

SUMMARY OF THE INVENTION

Vibration filtering techniques for micromachined mechanical systems are disclosed. In one embodiment of the present invention, a micromachined device for filtering vibrations caused by an external disturbance is disclosed. The device includes a first electrostatic vertical comb drive assembly. The first electrostatic drive assembly can include a first array of stationary elements and a second array of movable elements correspondingly interspersed with the first array. The device can include a plurality of springs, each spring coupled between a support frame and a proof mass. The proof mass, support frame and springs can be made of a same material. Alternatively, the proof mass, support frame and springs can be made of a different material.

In accordance with the present invention, the first array of stationary elements is preferably coupled to the support frame and the second array of movable elements is preferably coupled to the proof mass. Preferably, the first drive assembly is configured for motion in the z-direction, but can be configured alternatively for motion in other directions. An external voltage can be applied across the first array and the second array.

The device of the present invention can include a position sensor coupled to the device for sensing a displacement of the proof mass with respect to the support frame. The position sensor can comprise one of: a capacitance sensor, a piezoresistive sensor, a magnetic sensor and an interferometer.

In another embodiment, the device can include a second electrostatic vertical comb drive assembly. In one embodiment, the first drive assembly and the second drive assembly can tune the frequency response of the device. The second drive assembly preferably includes a third array of stationary elements and a fourth array of movable elements correspondingly interspersed with the third array. The first array of stationary elements and the third array of stationary elements are preferably coupled to the support frame. The second array of movable elements and the fourth array of movable elements are preferably coupled to the proof mass. At least one of the first drive assembly and the second drive assembly is configured for motion in the z-direction, but can be configured alternatively for motion in other directions. Alternatively, the second drive assembly can be positioned in line with the first drive assembly.

In accordance with another embodiment of the present invention, a micromachined device for filtering mechanical vibrations caused by an external disturbance is disclosed. The device includes a plurality of springs, wherein each spring is coupled between a support frame and a proof mass. The device comprises a first electrostatic vertical comb drive assembly for generating a restoring force on the proof mass; and a second electrostatic vertical comb drive assembly for measuring displacement of the proof mass with respect to the frame. The device can further include a feedback network to signal process the displacement measurement to control at least one of the first drive assembly and the second drive assembly. At least one of a momentary velocity and acceleration of the proof mass is estimated by signal processing the displacement measurements. The signal processed displacement measurements can be used to calculate a driving voltage for the first drive assembly. In one embodiment, the second drive assembly can be positioned orthogonally about a z-axis from the first drive assembly.

In accordance with another embodiment of the present invention, a micromachined device for filtering mechanical vibrations caused by an external disturbance is disclosed. The device comprises a first set of fixed individual comb drive structure elements having outer fixed electrodes and inner fixed electrodes wherein each fixed electrode is electrically insulated from one another. A drive voltage of each electrode can be independently set by an external voltage. The device can include a second set of movable individual comb drive electrodes. The outer fixed electrodes can determine a relative position of the proof mass with respect to the fixed electrodes by measuring capacitance between each fixed electrode and motion control electrode closest to the fixed electrode. Preferably, the inner fixed electrodes move the proof mass by electrostatic actuation in at least one of: one-dimensional motion, two-dimensional motion, and three-dimensional motion. At least one of the movable electrodes can be electrostatically pulled closer to at least one of the fixed electrodes. The device can further include a feedback network for processing displacement measurements and generating control voltages for the inner fixed electrodes.

In accordance with another embodiment of the present invention, a micromachined device is disclosed. The device comprises a support frame, one or more springs, a proof mass, electrostatic actuators; and a feedback network to isolate the proof mass from external vibrations in one of two-orthogonal and three-orthogonal axes in a selectable frequency band by attenuation of the external vibrations in the selectable frequency band.

DETAILED DESCRIPTION OF THE PREFERRED EMBODIMENTS

Figure 1:
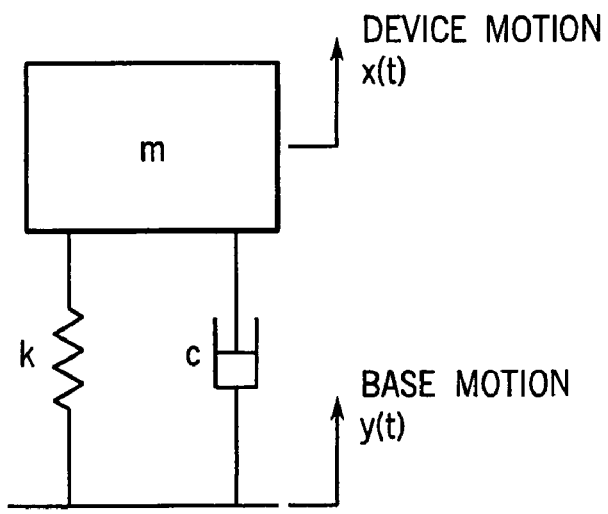
FIG. 1 is a prior art vibration isolation system represented by a rigid mass, m, connected to a base with a linear spring and damper pair, k and c, respectively.
Figure 2:
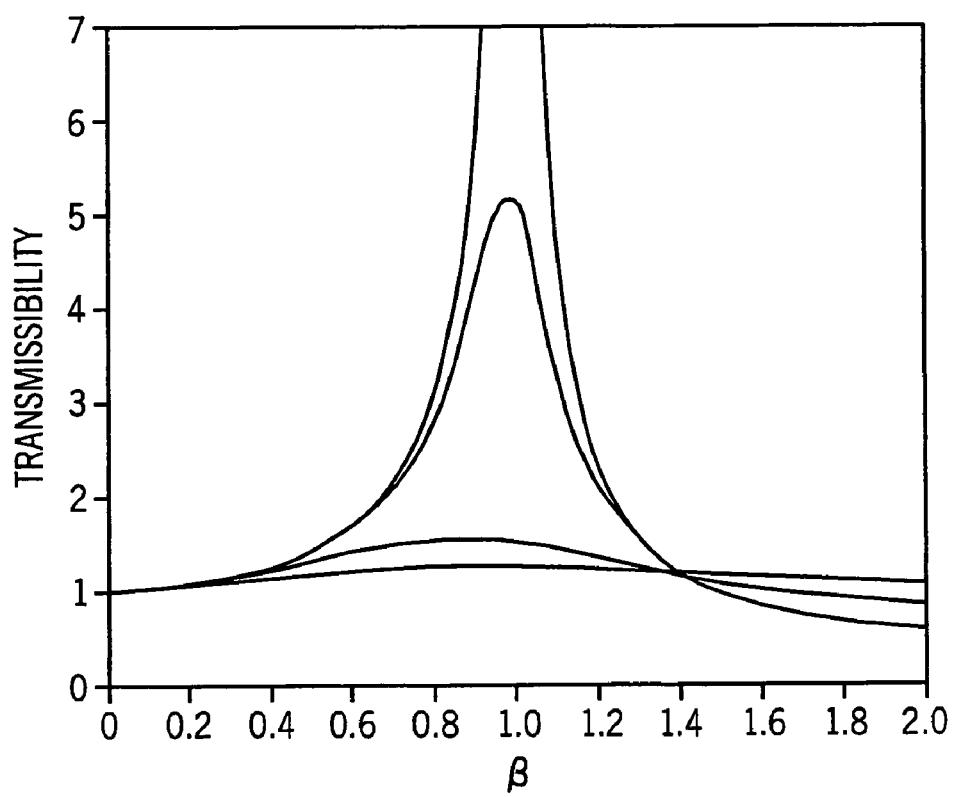
FIG. 2 is a plot of transmissibility for various damping levels of the damping ratio, $\zeta$, for the vibration isolation system of FIG. 1.
Figure 3:
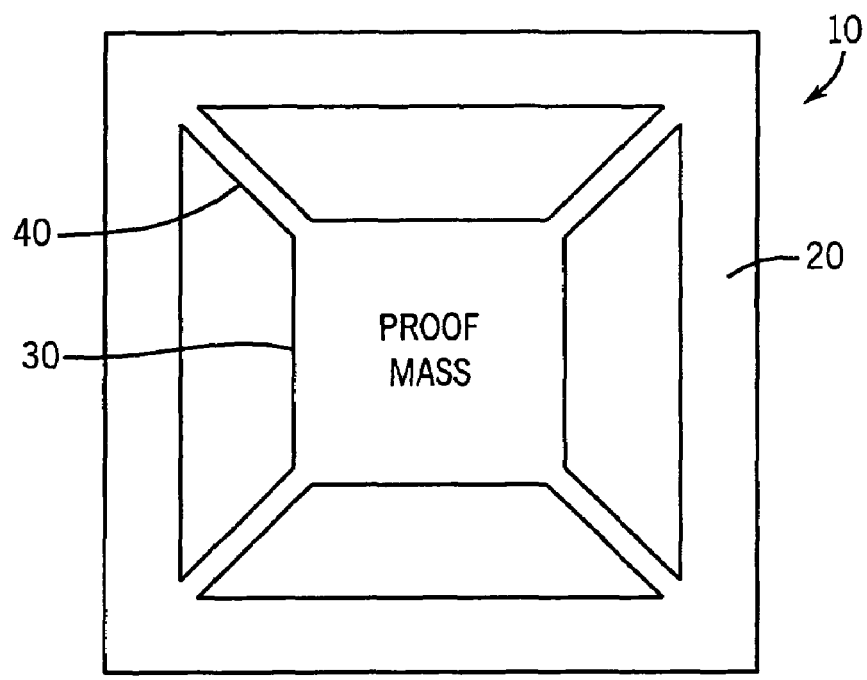
FIG. 3 is a prior art micromachined mechanical system including a frame, a proof mass and springs for filtering mechanical vibrations.
Figure 4:
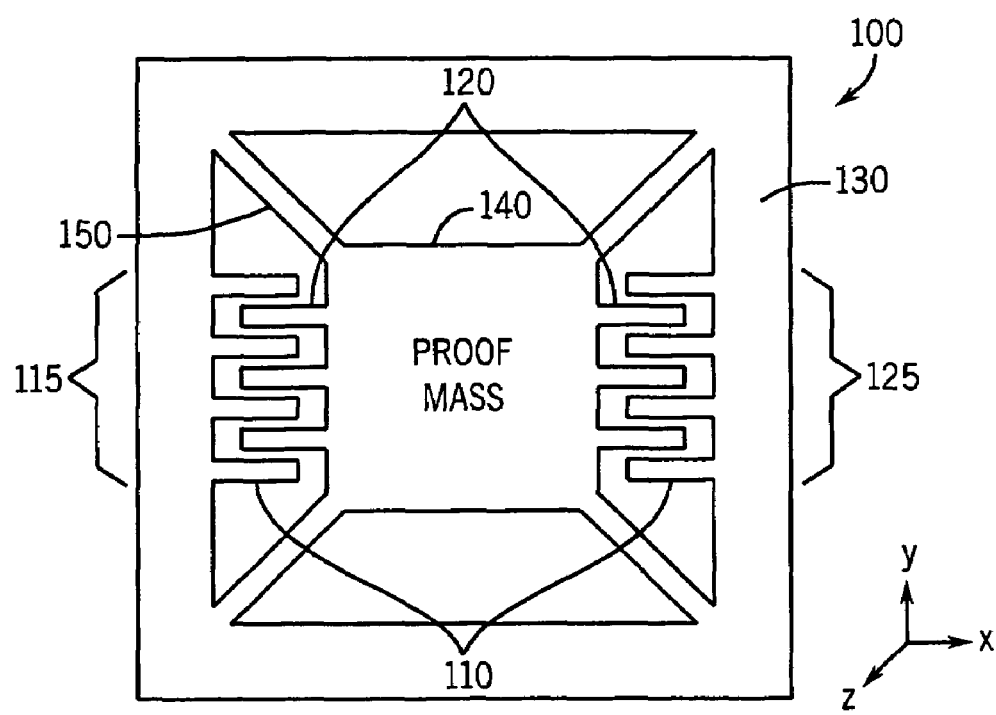
FIG. 4 is an illustration of a micromachined mechanical system coupled with an electrostatic vertical comb drive assembly having a first array of stationary elements and a second array of movable elements correspondingly interspersed with the first array, in accordance with an embodiment of the present invention.

FIG. 4 is an illustration of a micromachined (MEMS) mechanical system 100 in accordance with the present invention. The MEMS mechanical system illustrated in FIG. 4 includes a vertical comb drive assembly including a first array of stationary comb drive elements 110 coupled to a support frame 130 and a second array of movable comb drive elements 120 coupled to a proof mass 140. The system 100 also includes a plurality of springs 150 wherein each spring is coupled between the frame 130 and the proof mass 140. In one embodiment, the system 100 is fabricated of the same material, although the system can be fabricated from different materials. In one embodiment, a first set of individual comb drive elements 115 on one side of the proof mass 140 are electrically isolated from a second set of individual comb elements 125 on the other side of the proof mass 140.

In a preferred embodiment of the present invention, the individual comb drive elements 115 and 125 are configured as vertical comb drives for motion in the z direction. Preferably, the individual comb drive elements 115 and 125 can be operated together. When a voltage is applied across the individual comb drive elements 115 and 125, between the proof mass 140 and the frame 130, the balanced operation of the individual comb drive elements 115 and 125 results in a restoring force that attempts to keep the proof mass 140 in the x-y plane with the comb drive elements 110 coupled to the frame 130. Any perturbation in the + or − z direction will result in the proof mass 140 experiencing an electrostatic force attempting to move the proof mass 140 back into plane with the frame 130. Recall from above, the restoring force is proportional to the voltage across the comb drives squared, and is independent of the displacement in the z direction. The resulting differential equation of motion becomes, for the free response:

$$m\ddot{z}+c\dot{z}+kz-sgn(z)qV^2=0$$

where m is the mass, c is the damping, k is the system spring constant, sgn(z) is the sign of the proof mass displacement in the z direction, q is a constant related to the comb drive and V is voltage applied across the comb drive.

Dynamics of the system 100 are such that an external voltage (not shown) can be applied to change the frequency response of the MEMS mechanical system 100, therefore making it tunable. Additionally, multiple comb drives could be added to allow for having more than one external voltage that can be used to adjust the frequency response.

In addition to being an actuator, comb drive structures can be used to measure displacement of movable combs into or out of stationary combs by measuring a capacitance between movable and stationary combs, since the capacitance is directly proportional to the amount of tooth to tooth meshing (ignoring fringing effects). Therefore additional comb drive structures can be added to the device presented in FIG. 4 to measure the proof mass displacement in the z direction.

Figure 5:
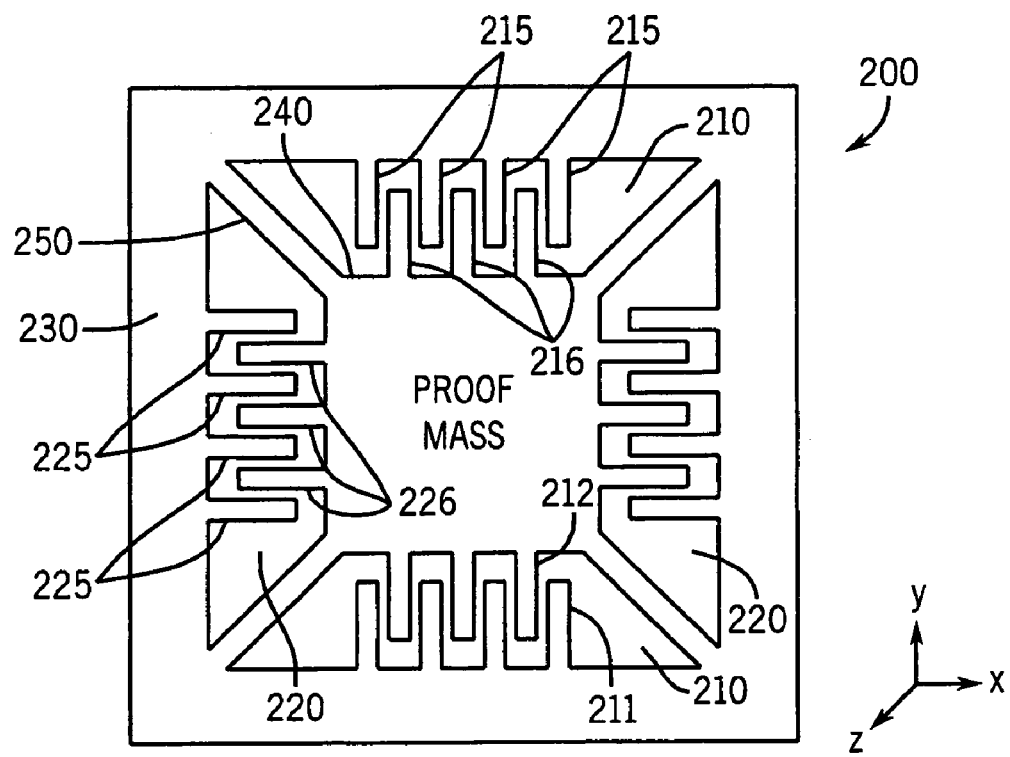
FIG. 5 is an illustration of a micromachined mechanical system coupled to two electrostatic vertical comb drive assemblies, each assembly having stationary and movable elements, in accordance with another embodiment of the present invention.

FIG. 5 is an illustration of a micromachined mechanical system 200, in accordance with an alternative embodiment of the present invention. The system 200 includes two vertical comb drive assemblies including a first set of individual comb drive elements 210 and second set of individual comb drive elements 220. The first set of comb drive elements 210 includes a first array of stationary elements 215 and a second array of movable elements 216. The first array of stationary elements 215 is coupled to a support frame 230 and the second array of movable elements 216 is coupled to a proof mass 240. The second set of comb drive elements 220 includes a third array of stationary elements 225 and a fourth array of movable elements 226. In one embodiment, the first set of comb drive elements 210 is electrically isolated from the second set of comb drive elements 220. In one embodiment, the first set of comb drive elements 210 is positioned orthogonally about a z-axis from the second set of comb drive elements 220. Alternatively, the first set of comb drive elements 210 can be positioned in any orientation about the z-axis, including in-line with the second set of comb drive elements 220.

Still referring to FIG. 5, the second set of comb drive elements 220 is used to generate a restoring force on the proof mass 240, as in the system 100 of FIG. 4, and first set of comb drive elements 210 is used to measure displacement of the proof mass 240 in the z direction by measuring a capacitance between stationary and movable combs, such as stationary comb element 211 and movable comb element 212. By recording (sampling) the displacement of the proof mass 240 at a much higher rate than the highest frequency by which the proof mass 240 is externally driven, a process called oversampling, a momentary velocity and acceleration of the proof mass 240 can be estimated by signal processing the displacement measurements made with one of the sets of comb drive elements 210 and 220. The resulting data can be used to calculate a driving voltage for the other one of the sets of comb drive elements 210 and 220, so that the driving voltage is a function of proof mass displacement, estimated velocity and or estimated acceleration. Therefore the resulting differential equation of motion becomes:

$$m\ddot{z}+c\dot{z}+kz+q_1\ddot{z}+q_2\dot{z}+q_3z+q_4=0$$

where $q_1$ through $q_4$ are programmable values determined in whole or in part from the displacement measurements through a signal processing feedback network (not shown). This equation can be rewritten as follows:

$$(m+q_1)\ddot{z}+(c+q_2)\dot{z}+(k+q_3)z+q_4=0$$

If $q_4$ is set to zero, the mechanical system has the following characteristics:

$$\omega_n=[(k+q_3)/(m+q_1)]^{1/2} \text{ and } \zeta=0.5(c+q_2)/[(k+q_3)(m+q_1)]^{1/2}.$$

Therefore the resulting mechanical system 200 has a tunable frequency response that can be controlled by electronically changing the signal processing in the feedback loop (not shown). The signal processing can be accomplished by analog, digital, time domain, frequency domain or a combination of techniques.

The system 200 illustrated in FIG. 5, with an appropriate feedback loop, can be used to realize a micromachined vibration filter that filters external vibrations applied in the z direction to the frame 230 with respect to the proof mass 240, with filter characteristics that are user tunable.

Figure 6:
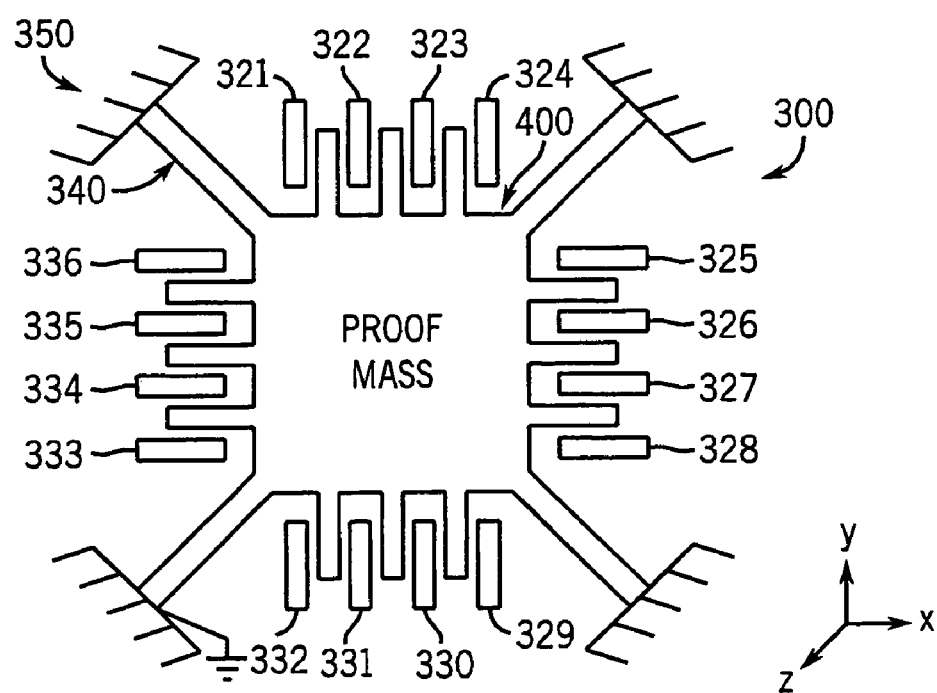
FIG. 6 is an illustration of a micromachined mechanical system coupled to two electrostatic vertical comb drive assemblies, each assembly having fixed individual comb drive structure elements that are electrically isolated from one another, in accordance with another embodiment of the present invention.

FIG. 6 is an illustration of an alternative micromachined mechanical system 300 including a first set of outer fixed electrodes 321, 324, 325, 328, 329, 332, 333, and 336 coupled to a support frame (not shown) and a second set of inner fixed electrodes 322, 323, 326, 327, 330, 331, 334 and 335 coupled to the support frame (not shown). The one-dimensional electrostatically tunable vibration isolation filters discussed in conjunction with FIGS. 4 and 5 above can be modified to realize multi-axis electrostatically tunable vibration isolation filters, as shown in FIG. 6. The system 300 is similar to the vibration isolation filter presented in FIG. 5, except that the fixed electrodes 321-336 are electrically insulated from each other and can have their drive voltages independently set by external circuitry (not shown). The system 300 also includes a plurality of anchored springs 340, spring anchors 350, and a proof mass 400 which are electrically grounded. The system 300 further includes a third set of movable electrodes coupled to the proof mass 400. In one embodiment, the first set of outer fixed electrodes 321, 324, 325, 328, 329, 332, 333 and 336 are used to determine the relative position of the proof mass 330 with respect to the fixed electrodes 321-336 coupled to the frame (not shown) by measuring the capacitance between each fixed electrode 321-336 and a closest electrode protruding from the proof mass 330, and comparing them to each other. When the proof mass 330 is centered, the measured capacitances are equal. Each pair or combination of electrode pairs will change differentially due to a unique displacement in one, two or three dimensions, yielding the displacement information. The second set of inner fixed electrodes 322, 323, 326, 327, 330, 332, 334 and 335, referred to as motion control electrodes, are utilized to move the proof mass 400 by electrostatic attraction in one, two or three-dimensional motion. Actuation can take place by at electrostatic parallel plate attraction, where a movable electrode coupled to the proof mass 400 is electrostatically pulled closer to a fixed electrode coupled to the support frame (not shown), resulting from an applied potential difference between the two electrodes. An alternative actuation method is electrostatic comb drive actuation, similar to the one-dimensional case discussed in reference to FIG. 5. With either method, a feedback network (not shown) is used to process displacement measurements and to generate appropriate control voltages for the motion control electrodes 322, 323, 326, 327, 330, 332, 334 and 335, to obtain a desired multi-axis mechanical frequency response.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention.

What is claimed is:

1. A micromachined device for filtering vibrations caused by an external disturbance, the device comprising:
   (a) a support frame;
   (b) a proof mass;
   (c) a first electrostatic comb drive assembly for filtering the vibrations caused by external disturbance including:
      (i) a first array of stationary elements coupled to the support frame, wherein each of the first array of stationary elements is electrically insulated from the others; and
      (ii) a second array of movable elements interspersed with the first array and coupled to the proof mass;
   (d) a position sensor coupled to the device for sensing displacement of the proof mass relative to the support frame; and
   (e) a control system for applying an external voltage across the first array and second array to change a frequency response of the device, wherein a drive voltage is independently set by the external voltage and one of the second array of movable elements is pulled electrostatically closer to one of the first array of stationary elements.

2. The device of claim 1 further including a plurality of springs, each spring coupled between a support frame and a proof mass.

3. The device of claim 2 wherein the proof mass, the support frame and the springs are made of a same material.

4. The device of claim 2 wherein the proof mass, the support frame and the springs are made of a different material.

5. The device of claim 1 wherein the first drive assembly is configured for filtering vibrations in the z-direction, wherein the support frame and the proof mass lie in a plane defined by an x and y-axis, and the z-direction is perpendicular to the x-y plane.

6. The device of claim 1 wherein the position sensor comprises one of: a capacitance sensor, a piezoresistive sensor, a magnetic sensor and an interferometer.

7. The device of claim 1 further including a second electrostatic vertical comb drive assembly.

8. The device of claim 7 wherein at least one of the first drive assembly and the second drive assembly are made of the same material.

9. The device of claim 7 wherein the second drive assembly includes a third array of stationary elements and a fourth array of movable elements correspondingly interspersed with the third array.

10. The device of claim 9 further including a plurality of springs, each spring coupled between a support frame and a proof mass.

11. The device of claim 10 wherein the first array of stationary elements and the third array of stationary elements are coupled to the support frame and wherein the second array of movable elements and the fourth array of movable elements are coupled to the proof mass.

12. The device of claim 10 wherein at least one of the first drive assembly and the second drive assembly is configured for motion filtering vibrations in the z-direction, wherein the support frame and the proof mass lie in a plane defined by an x and y-axis, and the z-direction is perpendicular to the x-y plane.

13. The device of claim 9 wherein an external voltage is applied across at least one of the first array and the second array and the third array and the fourth array.

14. The device of claim 9 wherein the first drive assembly generates a restoring force on the proof mass and the second drive assembly measures displacement of the proof mass with respect to the frame.

15. The device of claim 14 further including a feedback network to signal process the displacement measurement to control at least one of the first drive assembly and the second drive assembly.

16. The device of claim 9 wherein the second drive assembly is positioned orthogonally about the z-axis from the first drive assembly, wherein the support frame and the proof mass lie in a plane defined by an x and y-axis, and the z-axis is perpendicular to the x-y plane.

17. The device of claim 9 wherein the second drive assembly is positioned in line with the first drive assembly.

18. A micromachined device for filtering mechanical vibrations caused by an external disturbance, the device including a plurality of springs, each spring coupled between a support frame and a proof mass, the device comprising:
(a) a first electrostatic comb drive assembly for generating a restoring force on the proof mass wherein the first electrostatic comb drive assembly includes a set of fixed comb drive structure electrodes, each of which are electrically insulated from one another; and
(b) a second electrostatic comb drive assembly for measuring displacement of the proof mass with respect to the frame, wherein the second electrostatic comb drive assembly includes a set of movable comb drive structure electrodes, wherein a drive voltage of each electrode is independenly set by an external voltage and one of the movable electrodes is pulled electrostatically closer to one of the fixed electrodes by a potential difference established through the independently set drive voltage of the movable electrode and the fixed electrode.

19. The device of claim 18 further including a feedback network to signal process the displacement measurement to control at least one of the first drive assembly and the second drive assembly.

20. The device of claim 18 wherein the first drive assembly includes a first array of stationary elements and a second array of movable elements correspondingly interspersed with the first array and the second drive assembly includes a third array of stationary elements and a fourth array of movable elements correspondingly interspersed with the third array.

21. The device of claim 20 wherein the first array of stationary elements and the third array of stationary elements are coupled to the support frame and wherein the second array of movable elements and the fourth array of movable elements are coupled to the proof mass.

22. The device of claim 20 wherein an external voltage is applied across at least one of the first array and the second array and the third array and the fourth array to change a frequency response of the device.

23. The device of claim 18 wherein at least one of the first drive assembly and the second drive assembly is configured for filtering vibrations in the z-direction, wherein the support frame and the proof mass lie in a plane defined by an x and y-axis, and the z-direction is perpendicular to the x-y plane.

24. The device of claim 18 wherein the second drive assembly is positioned orthogonally about the z-axis from the first drive assembly, wherein the support frame and the proof mass lie in a plane defined by an x and y-axis, and the z-axis is perpendicular to the x-y plane.

25. The device of claim 18 wherein the second drive assembly is positioned in line with the first drive assembly.

26. The device of claim 18 further comprising a signal processing means wherein at least one of a momentary velocity and acceleration of the proof mass is estimated by signal processing the displacement measurements with the signal processing means.

27. The device of claim 26 wherein the signal processed displacement measurements are used to calculate a driving voltage for the first drive assembly.

28. A micromachined device for filtering mechanical vibrations caused by an external disturbance, the device comprising:
(a) a first set of fixed individual comb drive structure elements having outer fixed electrodes and inner fixed electrodes wherein each fixed electrode is electrically insulated from one another; and
(b) further including a first set of movable individual comb drive electrodes, wherein a drive voltage of each electrode is independently set by an external voltage and the movable electrode is pulled electostatically closer to one of the fixed electrodes by a potential difference established through the independently set drive voltages of the movable electrode and the fixed electrode.

29. The device of claim 28 further including a proof mass, a support frame and at least one spring, the first set of fixed elements coupled to the support frame, the second set of movable electrodes coupled to and protruding from the proof mass, the at least one spring coupled between the proof mass and the support frame.

30. The device of claim 29 wherein the outer fixed electrodes determine a relative position of the proof mass with respect to the fixed electrodes by measuring capacitance between each fixed electrode and one of the movable electrodes closest to the fixed electrode.

31. The device of claim 30 further including a feedback network for processing displacement measurements and generating control voltages for the inner fixed electrodes.

32. The device of claim 29 wherein the inner fixed electrodes move the proof mass by electrostatic actuation in at least one of: one-dimensional motion, two-dimensional motion, and three-dimensional motion.

* * * * *